M. LEITCH.
MILKING MACHINE PULSATOR.
APPLICATION FILED SEPT. 6, 1916.

1,322,588.

Patented Nov. 25, 1919.

WITNESS:

INVENTOR
Meredith Leitch
BY Frank S. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, A CORPORATION OF NEW JERSEY.

MILKING-MACHINE PULSATOR.

1,322,588.    Specification of Letters Patent.    Patented Nov. 25, 1919.

Application filed September 6, 1916. Serial No. 118,625.

*To all whom it may concern:*

Be it known that I, MEREDITH LEITCH, a citizen of the United States, residing at Poughkeepsie, county of Dutchess, and State of New York, have invented a new and useful Improvement in Milking-Machine Pulsators, of which the following is a full, clear, and exact description, reference being had to the accompanying drawings, which form a part of this specification.

My invention relates to improvements in pulsators for milking machines in which the pulsator valve is moved by pneumatic power. One object of my invention is to provide a pulsator which is easily controlled to have a uniform rate of pulsation. Another object is to provide a pulsator in which the milking machine valve will move quickly from one end of its travel to the other and then remain at rest until time for the return movement, which will also be made quickly. I am aware that it is old in the milking machine pulsator art to move a valve by pneumatic pressure acting on a piston or diaphragm in which control of the speed has been attempted by throttling the air supply; but this requires such small openings that unavoidable dust is liable to soon clog the openings and change the rate of pulsation.

I attain the object of my invention by having the throttle act on a fluid other than the operating fluid, such fluid being either of such high density as to require openings of a size not likely to clog, or coming from chambers not likely to be contaminated with dirt, and by having the speed control act on a member having no mechanical connection with the milking machine valve, which latter is free to move quickly under the influence of pneumatic pressures.

Figure 1:
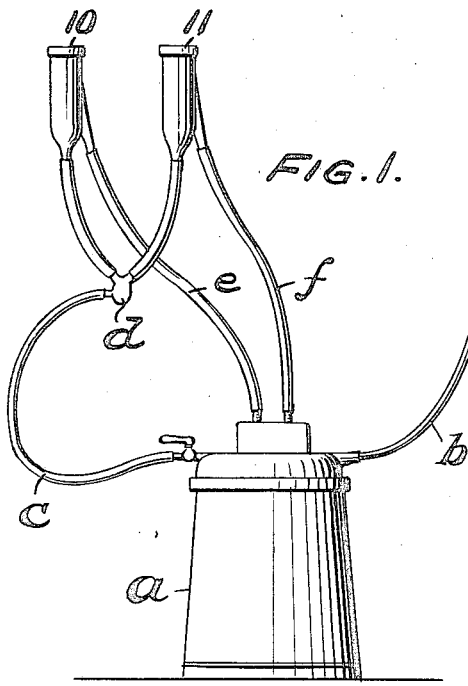
Figure 2:
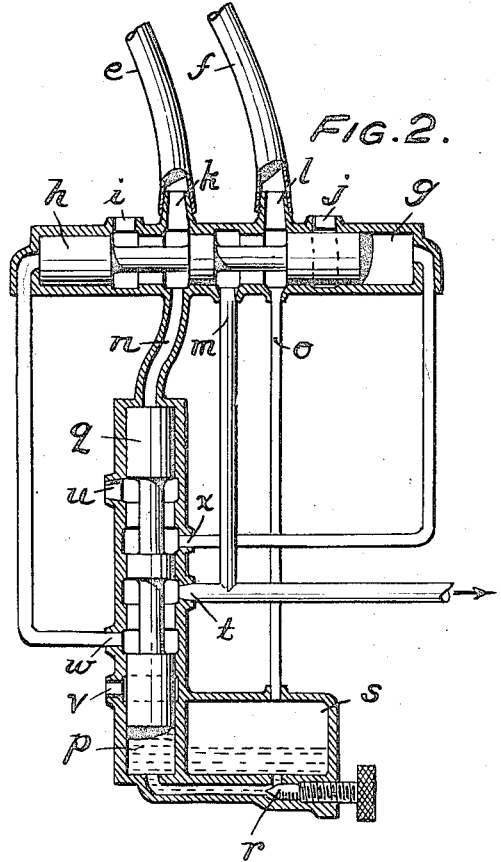
Figure 3:
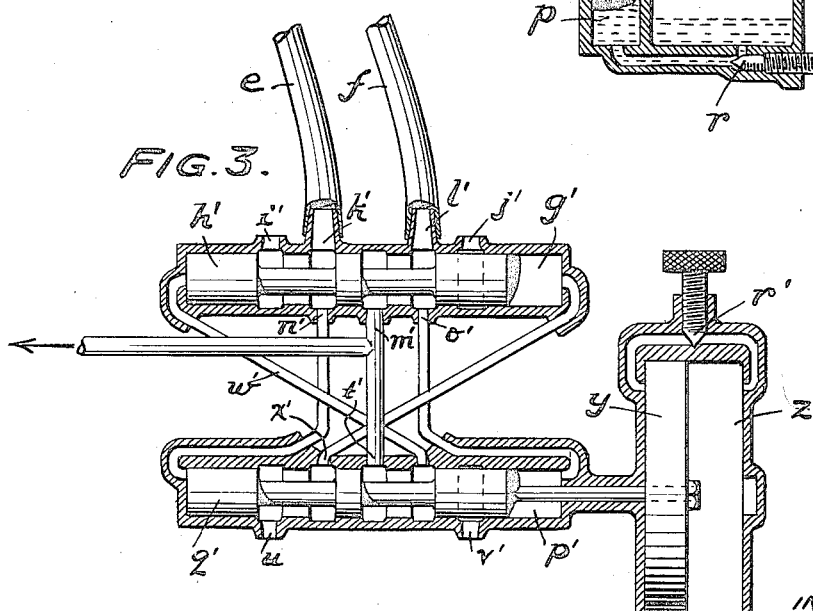

In the accompanying drawings, which show preferred embodiments of my invention: Figure 1 is a diagrammatic view of one milking unit. Fig. 2 is a diagrammatic view of one form of pulsator. Fig. 3 is a diagrammatic view of another form of pulsator.

The milk pail $a$ is connected by a flexible tube $b$ with a source of suction, not shown, and by another flexible tube $c$ with a cluster $d$ to which the milk tubes from the inner chambers of the several double chambered teat cups 10 and 11 are connected. The outer or pulsation chambers of the teat cups are connected by tubes $e$ and $f$ with the pulsator, which I preferably build in the pail cover. In the drawing I have shown only two teat cups, but it is to be understood that each of these is to represent one of a pair of similar cups. The pulsator shown is particularly adapted for use with double chambered teat cups operating on the alternate system described in a patent heretofore issued to me, No. 1,196,000 dated August 29, 1916; but different ports and passages may be provided suitable for other systems of milking if so desired.

Referring now to Fig. 2: $g$ is a cylinder containing the reciprocable piston $h$ having three full diameter portions and two small diameter portions. Ports $i$ and $j$ are atmospheric inlets. Ports $k$ and $l$ communicate through the tubes $e$ and $f$ with the teat cups, while passage $m$ communicates with a source of suction. With the valve in the position shown, the inflater of cup 10 is receiving air at atmospheric pressure, while that of cup 11 is being exhausted. The cylinder contains two other ports $n$ and $o$ which transmit pneumatic power to a cylinder $p$ in which the control valve piston $q$ reciprocates. With the piston $h$ in the position shown, atmospheric pressure is acting on top of the piston $q$. The lower end of the cylinder $p$ is filled with a liquid, as oil, which, passing through a speed regulating throttle valve $r$, offers a resistance to the movement of the piston. The liquid, after passing the throttle, enters a reservoir $s$, with which the port $o$ communicates, so that, with the valve $h$ in the position shown, the reservoir is subjected to suction and the piston $q$ will move downward. The cylinder $p$ has a port $t$ in communication with a source of suction, two atmospheric ports $u$ and $v$, and two ports $w$ and $x$ that communicate respectively with opposite ends of the cylinder $g$. With the piston $q$ in the position shown, the left end of the cylinder $g$ is in communication with suction and the right end is in communication with atmospheric pressure which has just moved the piston $h$ to the left. When the piston $p$ reaches the bottom of its stroke, the port $x$ will be in communication with suction and the port $w$ with the atmosphere. This will cause the piston $h$ to move to the right and reverse the connections to the cylinder $p$ so as to force the piston $q$ to the top. While with slow speeds it is very advantageous to use a liquid in the throttle valve, this may be dispensed with if the speed is high.

In the modification shown in Fig. 3, the principle of construction is the same and corresponding parts are similarly lettered except that they are primed. The operation is the same as that of the construction shown in Fig. 2 except that instead of obtaining a controlling resistance to the movement of the piston $q'$ by a liquid in contact with the piston, it is obtained by air in contact with a larger piston $y$ in a separate cylinder $z$. It will be observed that the air that passes the speed regulating valve $r'$ is the same air at all times, so that danger of clogging with dirt is extremely remote, and that the quantity is so great, because of the large size of the cylinder $z$, that the valve $r'$ will be of a size not likely to be clogged.

It is readily apparent that, in both forms shown, the pulsator valve $h$ or $h'$ is free to move quickly from either end of its cylinder, $g$ or $g'$, to the other on the application of pneumatic power. All speed control is applied to the auxiliary piston valve $q$ or $q'$, which is mechanically independent from, but pneumatically dependent on, the piston valve $h$ or $h'$.

Having now fully described my invention, what I claim and desire to protect by Letters Patent is:

1. In a milking machine pulsator, the combination with teat cups, of a pulsator valve, a control valve, said valves being mechanically independent, and pneumatic supply and exhaust passages and coöperating ports by which the pulsator valve supplies pneumatic pulsations both to the teat cups and the control valve and the latter supplies pneumatic pulsations to the pulsator valve, and an arrangement to retard the movement of the control valve comprising a displaceable fluid other than the actuating fluid and means to retard its flow, thereby causing the pulsator valve to remain at rest by reason of the retarded movement of the control valve and then shift quickly so as to give snappy pulsations to the teat cups.

2. In a milking machine pulsator, the combination with teat cups, of a cylinder and a valve member therein, a second cylinder and a valve member therein mechanically independent of the first mentioned valve member, the first mentioned cylinder having ports and passages adapted to coöperate with its valve member to supply pneumatic pulsations to said teat cups and to transmit pneumatic impulses to the second valve member, the second cylinder having ports and passages adapted to coöperate with its valve member to supply pneumatic impulses to the first valve member, a liquid-containing reservoir, and a throttled connection between the same and the second valve member to retard the latter's movement.

3. In a milking machine pulsator, the combination with teat cups, of a pulsator valve, a control valve, said valves being mechanically independent, pneumatic supply and exhaust passages and coöperating ports by which the pulsator valve supplies pneumatic pulsations both to the teat cups and the control valve and the latter supplies pneumatic pulsations to the pulsator valve, a displaceable body of fluid other than the pneumatic operating fluid against which the control valve operates, and means to substantially restrain the free displacement of said fluid, whereby the movement of the last named valve is substantially retarded.

4. In a milking machine pulsator, the combination with teat cups, of a pulsator valve, a control valve, said valves being mechanically independent, pneumatic supply and exhaust passages and coöperating ports by which the pulsator valve supplies pneumatic pulsations both to the teat cups and the control valve and the latter supplies pneumatic pulsations to the pulsator valve, and regulable retarding means to provide a resistance to the movement of the control valve, said retarding means comprising a body of liquid other than the operating fluid and means to regulate its rate of flow.

5. In a milking machine pulsator, the combination with a pair of double-chambered teat cups, of a pneumatically operated pulsator valve connected with, and adapted to supply pneumatic pulsations to the outer chambers of the two teat cups alternately, a control valve connected with and controlled by the pulsator valve and adapted in its operation to shift the pneumatic connections to the pulsator valve to reverse the position of the latter, and means to retard the movement of the control valve, thereby causing the pulsator valve to remain at rest in each of its operative positions by reason of the retarded movement of the control valve and then shift quickly.

6. In a milking machine pulsator, the combination with a pair of double-chambered teat cups, of a pulsator valve, means adapting said valve in one position to connect the outer chamber of one teat cup with suction and the outer chamber of the other teat cup with atmosphere and in another position to reverse said connections, and a control valve connected with, and pneumatically controlled by the pulsator valve and pneumatically controlling the pulsator valve, and means to retard the movement of the control valve.

In testimony of which invention, I have hereunto set my hand, at Poughkeepsie, N. Y., on this 30th day of August, 1916.

MEREDITH LEITCH.